A. A. ARNOLD.
SWAGING MACHINE.
APPLICATION FILED FEB. 1, 1913.
1,193,856.
Patented Aug. 8, 1916.
6 SHEETS—SHEET 1.
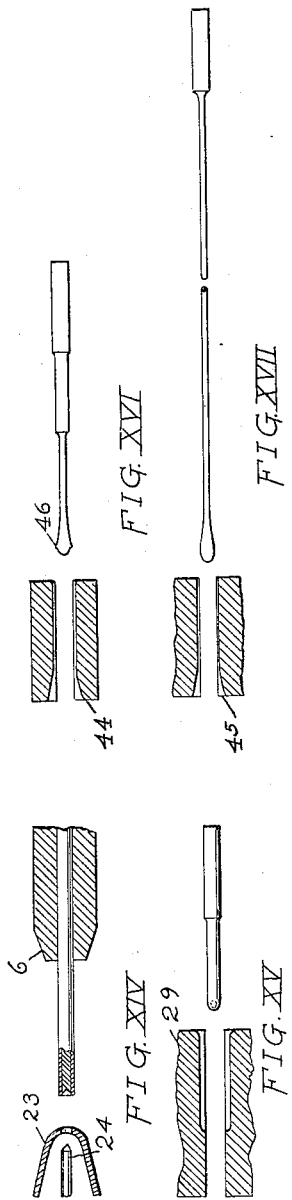
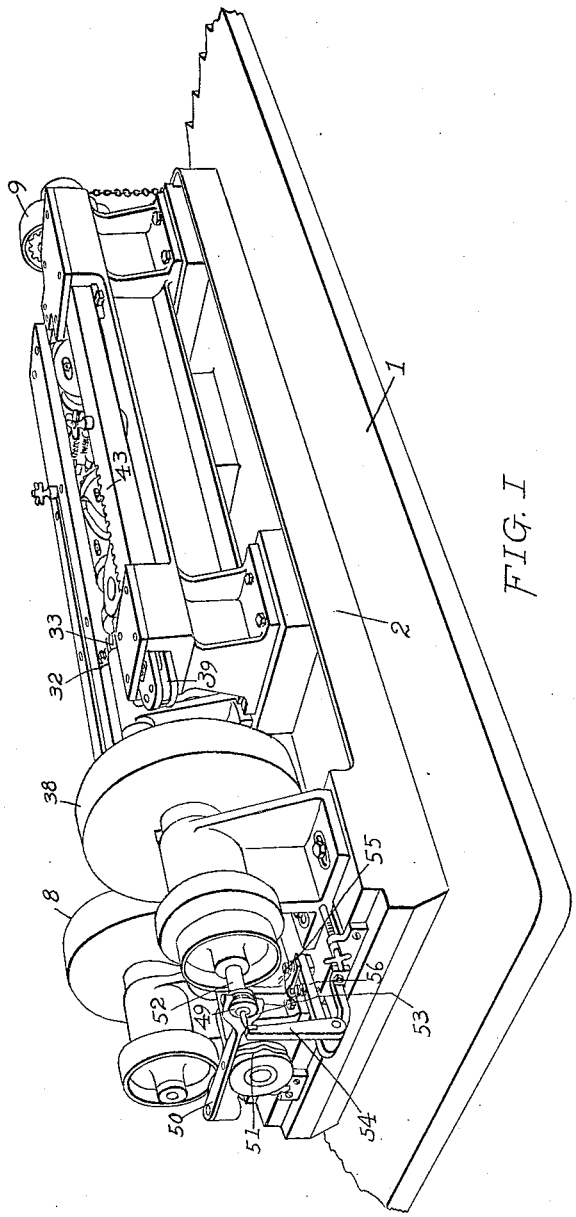
WITNESSES:
INVENTOR
ARTHUR A. ARNOLD
BY
ATTORNEYS

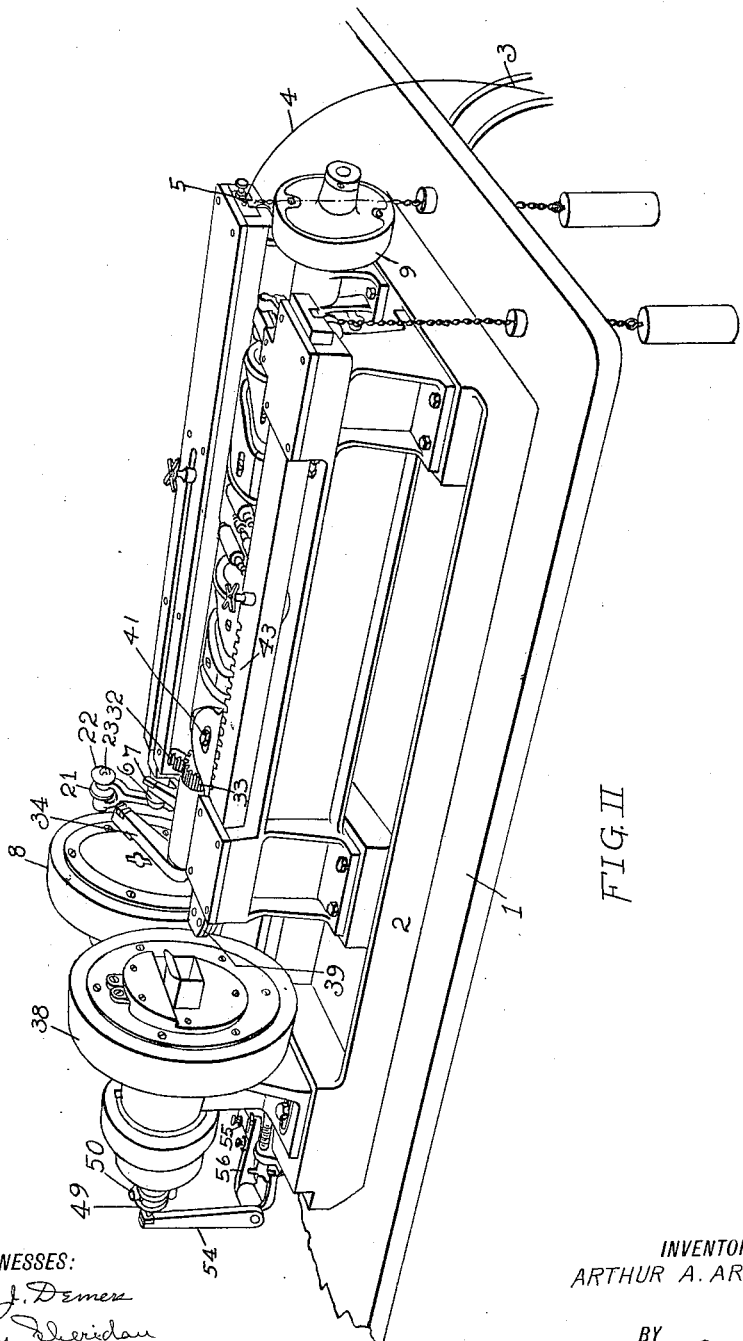

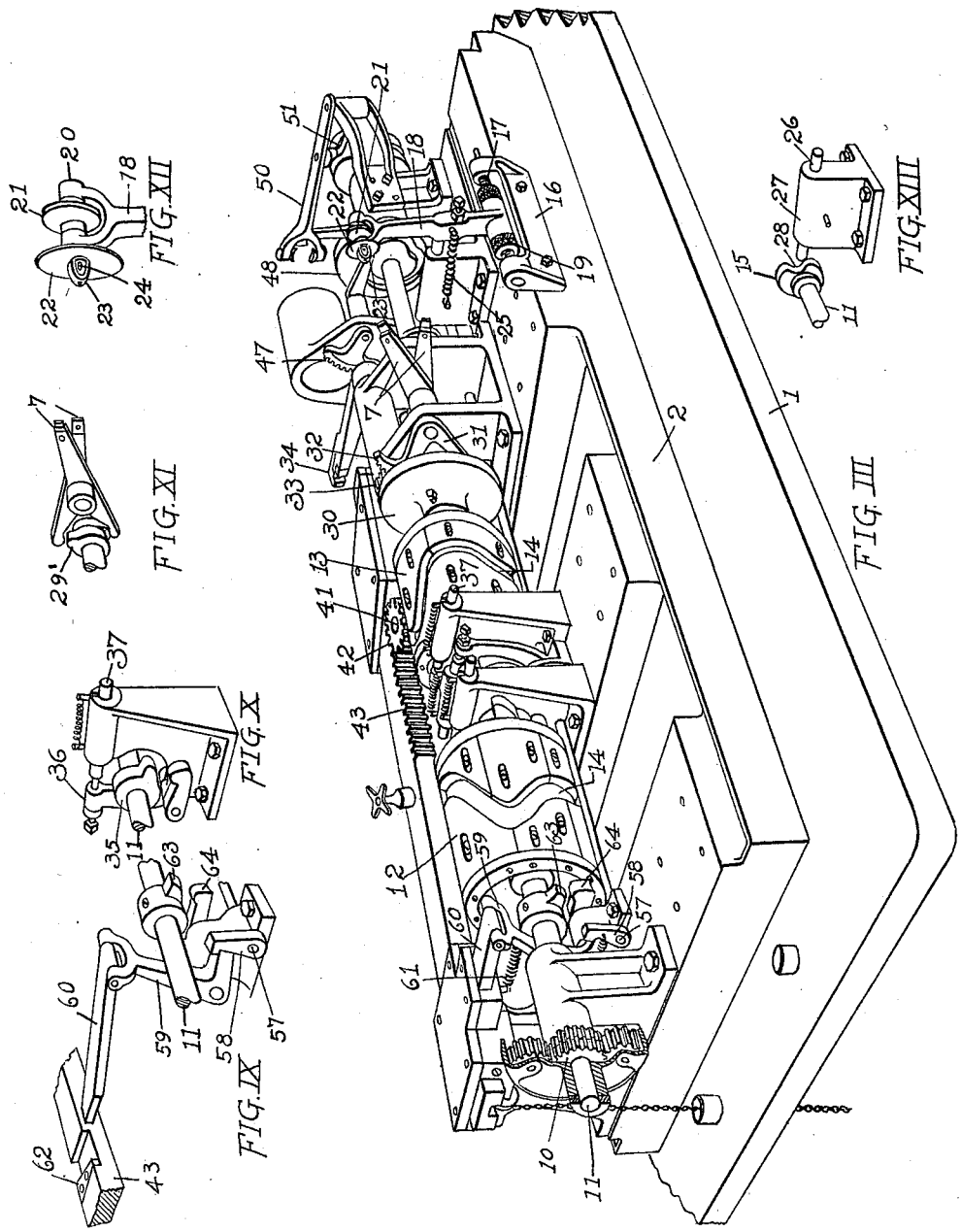

A. A. ARNOLD.
SWAGING MACHINE.
APPLICATION FILED FEB. 1, 1913.
1,193,856.
Patented Aug. 8, 1916.
6 SHEETS—SHEET 4.
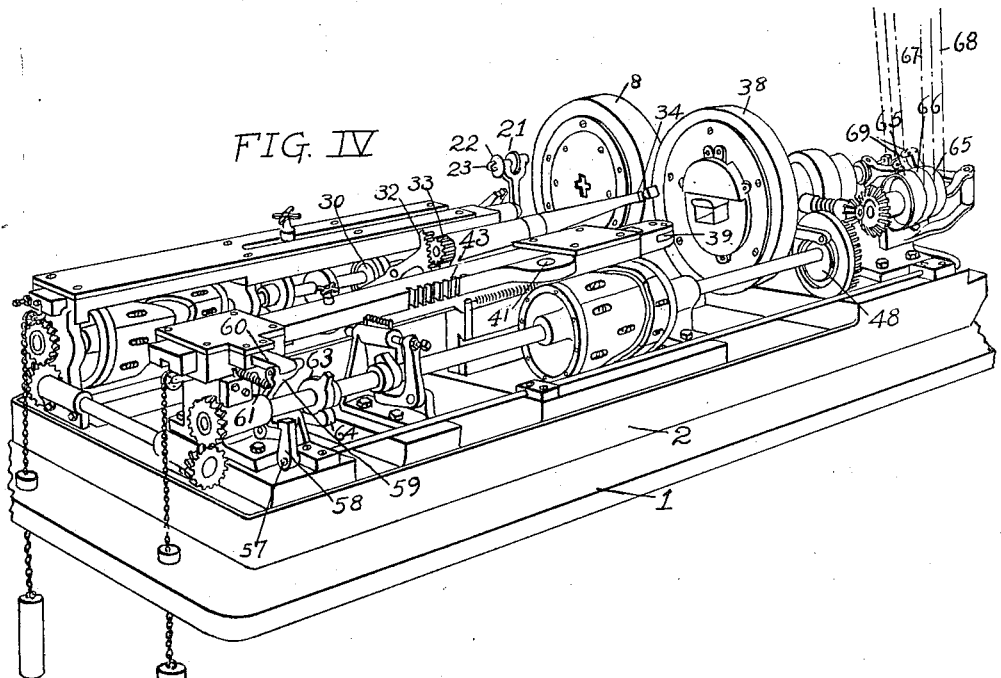
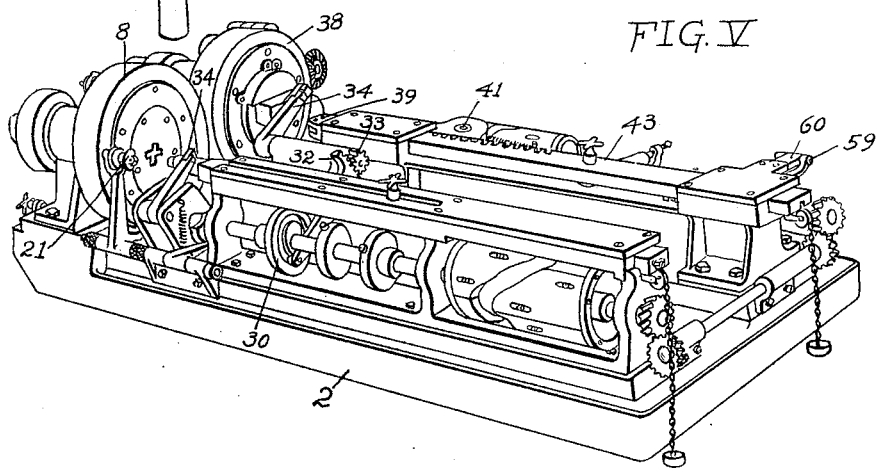
WITNESSES:
INVENTOR
ARTHUR A. ARNOLD
ATTORNEYS A. A. ARNOLD.
SWAGING MACHINE.
APPLICATION FILED FEB. 1, 1913.
1,193,856.
Patented Aug. 8, 1916.
6 SHEETS—SHEET 5.
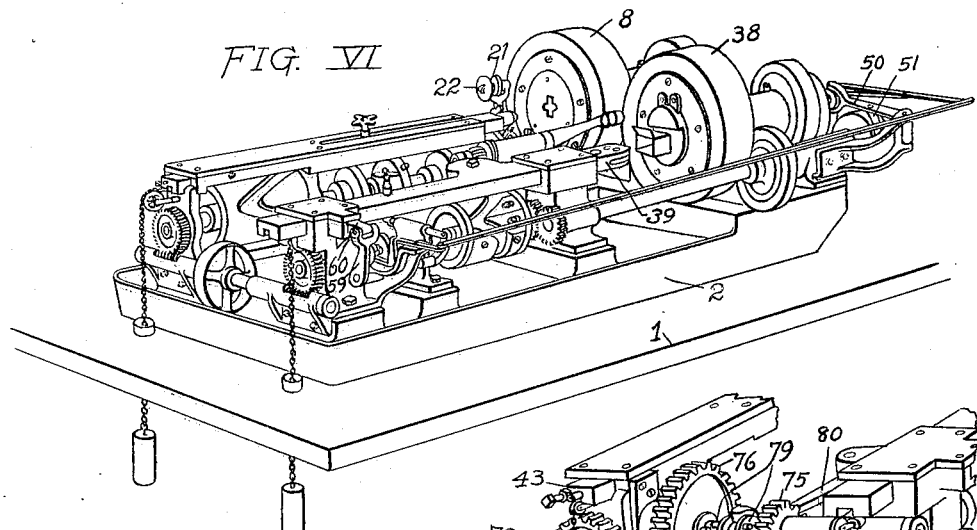
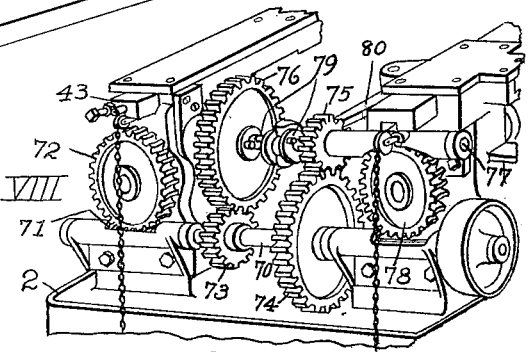
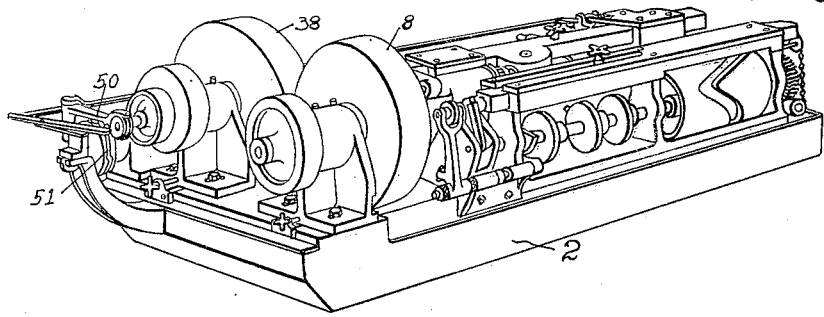
WITNESSES:
INVENTOR
ARTHUR A. ARNOLD
ATTORNEYS A. A. ARNOLD.
SWAGING MACHINE.
APPLICATION FILED FEB. 1, 1913.
1,193,856.  Patented Aug. 8, 1916.
6 SHEETS—SHEET 6.
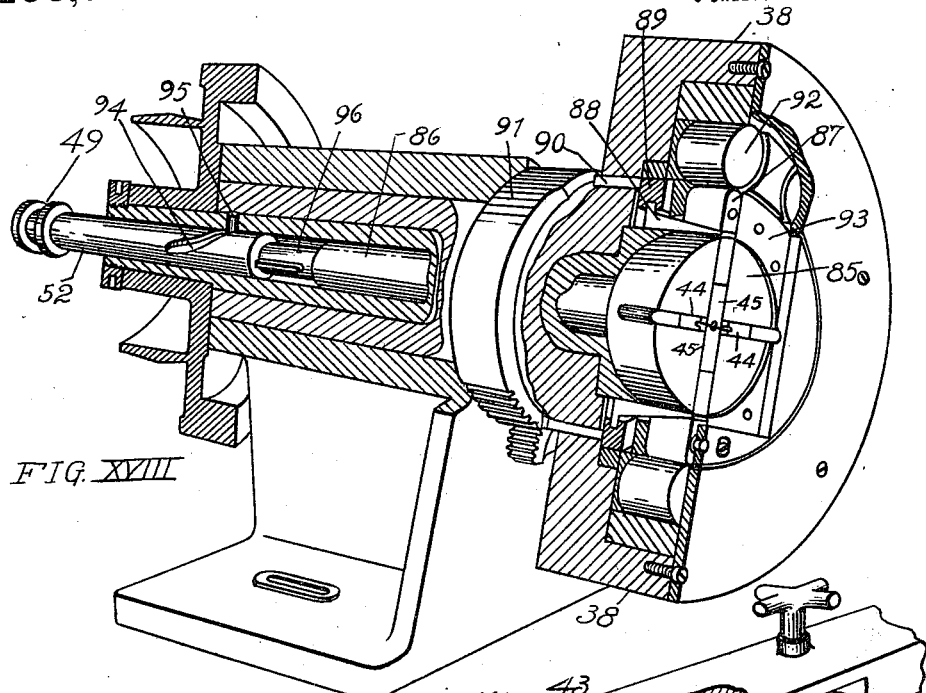
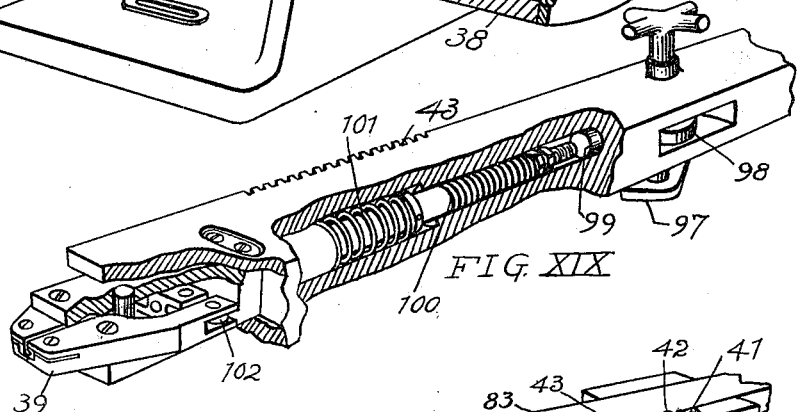
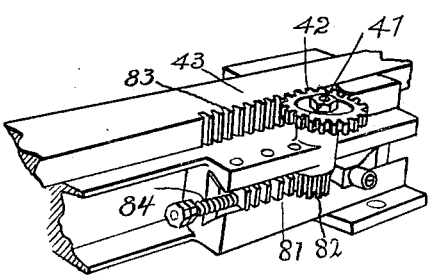
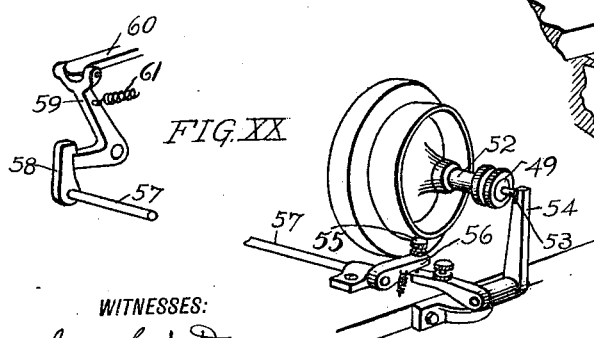
WITNESSES:
Joseph J. Demers
Florence E. Coderre
INVENTOR
ARTHUR A. ARNOLD
BY
H. H. Stytt & H. K. Parsons
ATTORNEYS

UNITED STATES PATENT OFFICE.

ARTHUR A. ARNOLD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

SWAGING-MACHINE.

1,193,856.

Specification of Letters Patent.

Patented Aug. 8, 1916.

Application filed February 1, 1913. Serial No. 745,604.

*To all whom it may concern:*

Be it known that I, ARTHUR A. ARNOLD, a citizen of the United States, residing at Southbridge, in the county of Worcester and State of Massachusetts, have invented certain new and useful Improvements in Swaging-Machines, of which the following is a specification.

My invention relates to improvements in swaging machines, and more especially to a machine particularly adapted for forming temples for spectacles, but which is capable of other similar uses in the manufacture of spectacle and eyeglass constructions.

The leading object of my invention is the provision of an improved construction of automatically operating swaging machine which will take a crude blank from a suitable source of supply and will in pre-determined sequence perform a series of operations on the same and finally discharge the article in a semi-finished condition without having been subject to any manual work or control whatever.

A further object of my invention is the provision of a machine of the character above set forth which shall be particularly adapted for use in swaging or reducing gold, gold filled and other precious metals in an entirely satisfactory manner and which, as in the case of filled stock will swage the same into various desired configurations without piercing the precious shell and which will also serve to cover certain of the exposed portions of the base core by swaging the said shell thereover.

Other objects and advantages of my improved construction of swaging machines should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a perspective view of one form of my invention. Fig. II represents a perspective view looking at the opposite end from the view shown in Fig. I. Fig. III represents another perspective view of my machine in partially dismantled condition particularly illustrating the main shaft and various parts carried and actuated thereby. Fig. IV represents a perspective view of a slightly modified construction. Fig. V represents a perspective view of the machine shown in Fig. IV but taken from a different angle. Fig. VI represents a perspective view of another modification. Fig. VII represents another view of the machine shown in Fig. VI. Fig. VIII represents a view of a two speed drive for use on the machine shown in Figs. VI and VII. Fig. IX represents a view of the automatic feed stop. Fig. X is a detailed view of one of the jaw controlling trips and the actuating mechanism therefor. Fig. XI is a similar view of the shears. Fig. XII represents a detailed view of the drill. Fig. XIII is a similar view of the drill controlling mechanism. Fig. XIV is a semi-diagrammatic view illustrating the drilling operation of my machine. Fig. XV is a similar view of the tipping operation and dies. Fig. XVI is a like view of the first reduction, and, Fig. XVII is a similar view showing a temple ready to be discharged by the machine. Fig. XVIII represents a perspective sectional view of the second head illustrating the dies and controlling mechanism therefor. Fig. XIX represents a perspective view of the feed slide and work holding jaws parts being broken away to more clearly illustrate the operation thereof. Fig. XX represents an enlarged fragmentary perspective view illustrating the automatic stop for the feed mechanism, and Fig. XXI represents a fragmentary perspective view illustrating the resilient or yielding means interposed in the feed slide for the second head.

In the drawings, in which similar characters of reference are employed to denote corresponding parts throughout the several views including the various modifications, the numeral 1 designates the table or support for my machine having suitably secured thereon the bed 2 from which rises a plurality of standards for supporting the various operating parts of the machine. Suspended at one end of the support 1 is a coil 3 from which extends the strand 4 of the material to be operated on by the machine, said strand 4 extending through the slide bar 5 and its gripping jaws 6 as is most clearly shown in Fig. II. By reference to this figure it will be seen that the jaws 6 serve to advance the material between the shear blades 7 to the tipping head 8. In the operation of my machine power is applied thereto through suitable driving connections to the shell pulley 9 and thence through the medium of the differential 10 to the shaft 11 which is thus rotated at a slow rate of speed. The shaft 11 is provided with a pair of barrel cams 12 and 13 each having a cam track 14, while the slide bar 5 has a roller, (not shown) which rides in the said cam track, the slide and thus the jaws 6 being reciprocated by the rotation of the barrel cam. When the machine is first started the jaws 6 are caused to grip the strand 4 with a portion of the strand equal to the length of blank desired projecting beyond the jaws. As the slide and jaws are advanced by the cam the drill controlling disk 15 on the shaft 11 is shifted to allow the drill to move into operative position.

In connection with the operation of the drill I would call particular attention to Figs. III, XII and XIII. Rising from the bed 2 is a bracket 16 supporting the threaded rod 17 on which is pivoted the drill arm 18 held in longitudinal adjustment relative to the bed and other parts of the machine by the nuts 19. The arm 18 is furcated at its upper end and has journaled therein the spindle 20 bearing the pulley 21 between the furcations adapted to receive a drive belt and having on its inner end the head 22 provided with the guide 23 for the work being operated on by the drill 24. The drill is normally held in outwardly swung position against the tension of the spring 25 by the pin 26 which passes through the guide 27 and has its inner end bearing against the periphery of the disk 15. Just as the strand 4 is being fed forward, however, the disk rotates to bring the notch 28 therein in alinement with the pin 26 when the pin moves into the notch and the spring 25 draws the drill arm into operative position, the stock passing through the guide 23 and being drilled out on the end or cupped as shown in Fig. XIV. Upon the completion of the drilling operation the cam slightly draws back the feed slide to withdraw the stock from the drill guide and the disk 15 by its continued rotation shifts the pin 26 to force the drill out of the way. The drill having been moved outward the feed again advances the stock into the tipping head 8 where the dies 29 round over the tip, and in the case of gold-filled stock as illustrated cover the base metal at the end with a layer of precious metal, as shown in Fig. XV.

Upon the completion of the tipping a triple operation is performed on the stock, the cams 29' at this time causing the shears 7 to bite into the stock to cut off a tipped blank, the face cam 30 rocking the arm 31 and thus the segment 32 which meshes with the pinion 33 to start the carrier arm 34 and bring it into gripping engagement with the stock, while the cam 35 rocks the bell crank or equivalent form of lever 36 and forces inward the trip pin 37 which engages the jaw controlling mechanism on the rearward movement of the slide. The jaws thus release the stock which is held by the carrier and shears until the controlling mechanism strikes a second trip pin which throws the jaws into gripping engagement with the stock to feed forward another blank. While the jaws are getting their new grip the shears have cut off the first blank which is transferred by the carrier to the second head 38 where it is grasped by the second set of feed jaws 39 whose operation is controlled by certain of the trip pins 37 operated by the cams 35 on the shaft 11.

I will now describe the cycle of operations in connection with the second feed, it being understood that while these operations are going on the previously described operations are being performed on a second piece of the stock 4.

It will be understood that when the blank is positioned by the gripping jaws 39 in a position to be operated upon by the second head 38 the longitudinal range of movement of the feed slide 43 will necessarily be greater than that of the slide bar 5, because of the fact that the head 38 is adapted to swage the blank to its final maximum length and shape after the same has been initially reduced and partially lengthened by the head 8. In order to provide for the greater relative movement of the slide 43 attention is invited to the structure shown in Fig. XXI of the drawings.

After the stock or blank has been grasped by the jaws 39 the cam 30 returns the carrier arm to its initial position as shown in Fig. II. As it is desirable to have a greater length of movement of the blank when fed into the head 38 than when fed into the head 8 I somewhat modify the means for longitudinally shifting the feed slide and jaws, in that instead of the feed slide having a roller riding in the cam track of one of the barrel cams I employ a supplemental slide directly reciprocated by the said cam and having a rack 81 driving the pinion 82 on the lower end of the spindle 41 of the gear 42 which meshes with the rack 83 of the feed slide 43. I preferably provide a resilient or yielding connection such as the compression spring 84 between the feed cam and the slide to allow for the stopping of the advance of the latter without interfering with the advance of the cam and roller. This yielding connection is attained by means of a rod loosely passing through the supplemental slide and having one end thereof provided with means for engagement with the barrel cam, the other end of the rod being extended beyond the end of the slide and being provided on its terminal end with a head in the form of a pair of nuts, against which bears the outer end of a coil spring whose inner end is arranged in engagement with the ends of the slide. It will be noted that the gear 42 is relatively larger than the pinion 82 so that longitudinal movement of the supplemental slide by the barrel cam will impart a correspondingly greater longitudinal movement to the slide 43. It will also be noted from the structure set forth that should the slide 43 encounter a strong resistance, such as the jaws 39 abutting a portion of the head 38, the supplemental slide will still be allowed to move forward under the action of the barrel cam by reason of the rod sliding freely through the supplemental slide while this slide remains stationary, the spring being of sufficient strength when expanded to cause the supplemental slide to actuate the pinion and gear to move the slide 43 forward under ordinary working conditions.

The blank being held by the jaws 39, the rotation of the shaft 11 and its barrel cam through the mechanism just mentioned serves to advance and withdraw the same as required. I preferably employ in the head 38 the two sets of dies 44 and 45, the dies 44 first receiving the blank and reducing it to the shape shown in Fig. XVI, leaving a slight shoulder as at 46. The cam then suitably shifts the blank while the first set of dies are thrown out of operation and a second set moved into operative position when the shifting of the blank and the action of the dies is continued until the article is completed, the second set of dies going over the work done by the first set and removing the shoulder 46.

To regulate and control the operation of the dies in the head 38 I preferably employ the segment 47 meshing with a rack on the face cam 91, said segment being controlled by the cam 48 and working in conjunction with the spool 49 which is shifted by the yoke 50 and cam 51, said spool having operative connections with the dies in the head 38.

The operative connection with the dies in the second head for controlling the operation of the different dies will be best understood by reference to Fig. XVIII, from which it will be seen that there are mounted in the head two sets of dies 44 and 45 respectively, preferably disposed at right angles to each other. These dies are carried by the head portion 85 of the spindle sleeve 86 which has splined thereto the spindle 52. Surrounding the head 85 is the anvil head 93 rotatable with the head 85, said anvil head carrying the anvils 87 for engagement with the hammering rollers 92 contained in the head 38. Interposed between the anvil 87 and one of the dies 44 or 45, is a controlling wedge 88, whose position is controlled by the ring 89, the ring and thus the wedges being normally held inward by means of the pins 90 which engage the cam portion of face cam 91. The automatic operation of the die controlling mechanism which I have here employed is as follows: At the proper point during the operation of the machine the cam 48 rocks the segment 47 to shift the face cam 91. This shifting movement brings one of the cut-away portions of said face cam in alinement with each of the pins 90, when said pins may move outward and allow a similar movement of the ring 89 and wedges 88. This movement disconnects the anvils 87 from the set of dies with which they have been operating. The parts being in the position mentioned the arm 50 then shifts the spool 49 which as before mentioned is splined to the spindle 86. The inward or outward movement of the spindle 52 on account of the engagement of the pin 95, carried by the spindle portion 96 of the anvil head 93, in the groove 94 of the spindle 52, causes a relative quarter turn of the die and anvil head, thus bringing the anvil into alinement with the opposite set of dies from those with which they have been previously engaged, the wedges 88 turning with the anvils 87. Continued rotation of the cam 48 then serves to reversely rock the segment 47 and thus to shift the cam 91 to again force the pins 90 and thus the wedges inward into position to operatively connect the anvils with the opposite set of dies, the said second set of dies thus being shifted into position to operate upon the work. To again bring the first set of dies into operation the shifting of the various parts is exactly the same with the exception that the spindle 52 is moved in the opposite direction to reversely relatively rotate the die and anvil heads, as should be clearly understood by reference to Fig. XVIII.

In the manufacture of spectacle temples, for which my machine is particularly adapted, it is very desirable that the various temples turned out by the machine be of exactly the same length, and to attain this result I have provided an automatically operating stop mechanism which shall be actuated by the article being swaged when the same has reached a predetermined length and will absolutely prevent undue lengthening thereof. This stop mechanism should be best understood by reference to Figs. II, III, and IX, from which it will be seen that projecting from the outer end of the head spindle 52 is a slide pin 53 whose inner end engages the end of the article being swaged. As the said article is elongated by being swaged it will engage said pin and press the same outward to engage and rock the bell crank or equivalent lever 54 which is pivoted to the bed of the machine. This lever in turn engages the set screw 55 carried by the arm 56 of the rock shaft 57 which extends longitudinally of the machine, and has on its other end the latch member 58 which normally holds the bell crank lever 59 and thus the slide locking bar 60 inward against the tension of the spring 61. Upon rocking of the bell crank lever 54 as above described, however, the latch 58 releases the lever 59 and the spring forces the lever and thus the lock bar outwardly, the beveled face of the bar engaging the corresponding face of the contact plate 62 carried by the slide 43 and preventing further forward movement of the said feed slide, the yielding connection in the drive for the said feed slide permitting the continued movement of the other parts of the machine while the feed slide 43 is stationary.

As the actuating barrel cam for the feed slide 43 starts to draw back the slide 43 the cam 63 on the shaft 11 engages the rock arm 64 which is mounted to swing with the bell crank lever 59, and this engagement of the rock arm serves to reversely rock the bell crank against the tension of its spring to withdraw the locking bar from engagement with the feed slide and return it to a position where the latch 58 can secure it until it is again necessary to stop the feed slide 43. Continued backward movement of the slide 43 brings the jaw controlling device 97 into contact with certain of the pins 37, causing the jaws 39 to release the swaged blank and on the return forward movement to grasp a new blank from the carrier arm. This operation of the jaws will be best understood by reference to Fig. XIX from which it will be seen that the jaw controlling device comprises a spindle having on its lower end the member 97 adapted to be engaged successively by the pins 37 and having intermediately disposed thereon the oval contact member or cam 98. Rotating of the spindle by striking of one of the pins 37 against the member 98 brings the longer dimension of the oval parallel to that of the slide, forcing the pin 99 outward and thus forcing in the same direction the spindle 100 against the tension of the spring 101, this movement loosening the links 102 carried by the head of the spindle and serving to swing open the jaws 39, as is clearly illustrated. The next engagement of one of the pins 37 with the member 97 shifts the parts back into the position shown in Fig. XIX, when the spring 101 expands and moves the spindle and thus its head rearwardly, the links 102 on account of their position being forced into divergent relation to spread apart the rear ends of the jaws and thus to tighten the grip of the forward or nose portions thereof on the work.

It is to be noted that in the form of my invention shown in Figs. I, II, and III all of the controlling mechanism for the various automatic operations of my machine is carried by the one shaft 11, the timing of the various operations being determined by the relative position of the parts of the cams and this form being preferable as most easy to set the various cams accurately, this timing to secure the correct sequence of operations each occurring at exactly the right moment being of great importance since if not correct the parts will work against instead of with each other and thus ruin the work.

While the form of my invention just mentioned is the preferred one I do not wish to limit myself to this form of the invention, since the two slides for feeding the work to the dies may have separate operating shafts and cams, but if this is the case it is essential that the said shafts be so intergeared that the various cam shafts will each complete a full revolution at the same time and thus to all practical purposes act in the same manner as a single shaft. Certain embodiments of machines having a plurality of cam shafts have been shown in Figs. IV to VIII inclusive.

By reference to Figs. XIV to XVIII it will be noted that a greater amount of reduction is done by the head 38 than is done by the head 8 and consequently ordinarily the head 8 cannot be run at its greatest efficient speed but must be slightly delayed to allow the head 38 to complete its operations. In Figs. IV and VIII, however, I show two forms of operating connections which will serve to speed up the machine at a certain suitable portion of the operation thereof and thus save considerable time in each article. In Fig. IV I have shown a pair of idlers 65 having between them the driving pulley 66 whose spindle is geared to the machine to drive the cam shafts thereof simultaneously. Passing around the idlers and drive pulley are a pair of belts 67 and 68 driven at different rates of speed, an automatically operating set of belt shifters 69 controlled by one of the cam shafts guiding either the slow running or the fast running belt onto the drive pulley from one of the idlers according to the speed necessary at the particular time.

Fig. VIII illustrates another form of two speed gearing in which the driven shaft 70 has the worm 71 directly driving the worm gear 72 on one of the cam shafts and is also provided with the large gear 74 and the pinion 73 in mesh respectively with the pinion 75 and gear 76 which are rotatably mounted on the worm shaft 77 which through the worm gear 78 drives the other cam shaft. Splined on said worm shaft 77 is a pin clutch member 79 adapted to clutch either the pinion 75 or gear 76 according to the speed temporarily desired, an automatically operating shift lever 80 controlling the engagement and disengagement of the clutch, and said operation of the clutch being so timed that the second cam shaft will at times rotate at a more rapid rate and at times slower than the first shaft but will complete each revolution at exactly the same moment as the first shaft.

From the foregoing description taken in connection with the accompanying drawings the construction and operation of my improved machine should be readily understood and it will be seen that I have provided an improved swaging machine which will receive the material from a suitable source of supply such as a reel or coil, will first drill and then tip the same, will then cut off a blank of the correct length, transfer it to a second head and feeding mechanism, will withdraw the transferring carrier, and will then perform a series of operations on the blank to produce the desired configuration therefrom, which configuration it will be understood may be varied from that illustrated by merely changing the face of the dies employed.

I claim:

1. The combination with a bed, of feed slides mounted thereon, work heads supported by the base in alinement with the feed slides, a stock supply, jaws on one of the feed slides for grasping the stock, a drill, means for swinging the drill temporarily into operative position and then withdrawing the same, means for advancing one of the feed slides to bring the stock held thereby into engagement with the drill and withdrawing the same before the drill is withdrawn, means for operating the slide to feed the stock into one of the work heads and withdraw the same, a carrier adapted to engage the stock when withdrawn from the work head, shears for cutting a blank from the stock, means for releasing the stock from the jaws as it is grasped by the carrier and shears, means for swinging the carrier to transfer the blank to the other slide, jaws on the second slide for grasping the blank, means for shifting the slide to reciprocate the blank in a second work head, a plurality of dies in said head for working on the blank, automatic means for throwing the various dies into and out of operative position, a stop actuated by the blank for limiting the feeding thereof, and means for automatically releasing the blank from the feeding jaws and for re-setting the stop.

2. A machine of the character described, including a drill for cupping out the end of the stock being operated on, tipping dies for rounding out the end of the cupped stock, means for severing the stock, transfer mechanism, feed mechanism having jaws for grasping the blank and removing the same from the transfer mechanism, and means for longitudinally reducing the blank while held by the feed mechanism to provide a semi-finished article.

3. A machine of the character described, including a work head having a set of dies mounted therein for operation on a blank of material to initially shape the same, a second head adjacent the first and provided with a plurality of sets of dies for operation on the initially shaped blank to provide a semi-finished article, timing mechanism for regulating the sequence of operation of the various sets of dies in the two heads, and a carrier operated by the timing mechanism for temporarily grasping the article being operated upon to transfer it from one head to the other.

4. A machine of the character described, including a pair of simultaneously operating work heads, one of said heads being adapted to initially operate on a blank of material, the other head being adapted to finish the operation of the first head, reducing dies in the heads, a reciprocating feed mechanism for each of the heads, grasping jaws in each feed mechanism for holding the blank in operative engagement with the work head, and the conveyer for temporarily grasping the material held by one set of jaws and transferring it to the grasp of the other set of jaws.

5. The combination with a pair of independent work heads, each being adapted to perform a distinct operation on a blank of material, of a feed mechanism alined with each of the work heads for feeding the blanks to the work heads, tipping dies in one of the heads for operation on the blanks, synchronously operating controlling devices for the feeding mechanisms, and a conveyer operated by the controlling mechanism for shifting the work from one to another of the work heads.

6. The combination with a pair of work heads having reducing dies therein, the dies of one head being adapted to partially reduce a blank of material, the dies of the other head being adapted to complete the reducing operation of the first head to provide a semi-finished article, of means for feeding the work into and out of one of the heads, means for intermittently engaging the work to transfer the same to the other head, and means for feeding the work into and out of the second head.

7. A machine of the character described, including a pair of heads each having a feed mechanism, reducing mechanism in the heads, the mechanism of one head being adapted to complete the reducing operation on a blank of material after said blank has been initially reduced by the other head, means for transferring the work from one to another of the heads, and timing mechanism for controlling the sequence of operations of the feed reducing and transfer mechanism.

8. A machine of the character described, including a primary work head, a secondary work head, hammering dies in one of the heads, means for automatically passing the work into and out of the said work heads and from one head to another, and means for causing a predetermined sequence of operations to be performed thereon.

9. A machine of the character described, including a pair of work heads adapted to perform a plurality of sequential operations, reducing dies in one of the heads, and a plurality of work holders separately and sequentially engaging the work to pass it through the various heads and from one head to another.

10. A machine of the character described, including a pair of independent heads for sequential operation on a blank of material, one head being adapted to complete the operation of the other head, separate feeds for the heads, synchronously rotating cams for controlling the feeds, a conveyer for transferring the work from one to another of the feeds, and timing mechanism for insuring the correct operation of the carrier relative to that of the feeds.

11. A machine of the character described, including a bed, a pair of work heads supported thereby for sequential operation on a blank of material, separate feeding mechanism for the work heads, synchronously rotating cams controlling the feeding mechanisms, a transfer mechanism timed to receive the finished work from one feed and transfer it to the other feed, a stop and means actuated by the work for operating the stop to insure of the various finished blanks being of the same length.

12. In an automatically operating machine of the character described, means for tipping one end of a blank to provide a uniform outer surface over its entire area, means for severing the same to provide a blank of a predetermined length, and means for receiving and longitudinally reducing the tipped and severed blank to provide a semi-finished article.

13. An automatic machine of the character described, including sequentially operating tipping mechanism for rounding one end of a blank of material, transfer mechanism for positioning the work to be operated upon by a series of sequentially operating tools, and means for removing the work from the transfer mechanism and reducing the tipped portion thereof.

14. A machine of the character described, including a tipping and reducing head for operation on one terminal of a blank of material, means for feeding the work thereto, an intermittently operating conveyer for removing the work from the feed, a second feed for grasping and removing the work from the conveyer, a work head mounted in alinement with the second feed and having a plurality of sets of dies therein, and means for automatically throwing the dies into and out of operation upon the blank to longitudinally reduce the same.

15. A machine of the character described, including a primary work head for initially reducing a blank of work longitudinally, a secondary work head for reducing the blank to a final predetermined size, conveyer mechanism operating between the two heads for transferring the blank from the primary to the secondary head, hammering mechanism in one of the heads, and automatic means for causing the operation of the various parts on a blank in a predetermined sequence.

16. A machine of the character described, including a drill for cupping out the ends of the stock being operated upon, means for heading the drilled end of the stock, a cutter to provide blanks of a predetermined length, means for reducing the work to a predetermined size and shape, and means for automatically operating the various mechanisms in the sequential order above set forth.

17. A machine of the character described, including means for tipping one terminal end of the stock being operated upon, means for cutting and means for transferring the same to a plurality of sets of sequentially operating reducing dies, and automatic means for controlling the operation of the various reducing and other mechanism in predetermined sequence.

18. A machine of the character described including a drill for cupping out a portion of the stock being operated upon, a tipping device for rounding over the material adjacent said cupped out portion and means for moving the stock from the drill to the tipping device.

19. In a machine of the character described, a drill for cupping out a portion of the stock being operated upon, a tipping device for rounding over the material adjacent said cupped out portion, and means for causing the sequential operation of said parts on the stock.

20. In a machine of the character described, a drill for cupping out the end of the stock being operated upon, a tipping device for rounding over the ends of the cupped stock, a cutter, and automatic means for causing the successive operation of said parts on the stock.

21. In a temple forming machine or the like, the combination with a plurality of dies adapted to form a bulb on the end of a piece of stock, of a drill for countersinking the end to facilitate rounding over the ends of the bulb.

22. In a temple forming machine or the like, the combination with a plurality of dies adapted to form a bulb on the end of a piece of stock, of a drill for countersinking the end to facilitate rounding over the ends of the bulb, and automatic means for moving the stock and operating devices into and out of engagement with each other.

23. In a machine of the character described, the combination with a work head, of a drill adjacent said head for countersinking the end of a piece of the stock, tipping devices contained in the head for rounding over the countersunk end of the stock, and feeding means adapted to successively bring the stock into engagement with the drill and the tipping device.

24. A machine of the character described, comprising a plurality of simultaneously operating heads for sequential operation upon a piece of material, and means for successively bringing a piece of stock into operative relation with the heads.

25. A machine of the character described, comprising a plurality of tools, means for simultaneously operating different tools on different pieces of stock, and means for successively engaging the same piece of stock with the different tools.

26. The combination with a support, of a drill, a cutter, and a plurality of work heads, means for selectively operating certain of said parts simultaneously on different pieces of stock, and means including transfer mechanism for bringing the same piece of stock into operative engagement with the various devices successively.

27. In a temple swaging machine or the like, the combination with a support and reducing heads mounted thereon, of work controlling cams mounted on the support, means for continuously rotating the various cams, and means for bringing a piece of work successively into operative relation to the various cams.

28. In a swaging machine, the combination with a set of work heads adapted to sequentially perform various operations upon a blank of material, means connected with them for operating on work held therein, a transfer device movable intermediate the heads, means for moving said device intermittently to carry the work from one head to another, means for feeding the work back and forth when in registration with the heads, said means comprising a series of rotary cams, means for constantly rotating said cams, and means for connecting each cam in succession with the individual pieces of work.

29. In a temple swaging machine, the combination with means for holding a blank, means for shaping said blank to a predetermined size and shape, means for drilling the end of the blank, means for shaping the drilled end of the blank, and means for moving said blank from said drilling means to said shaping means.

30. In a temple swaging machine, the combination of a set of forming devices, a plurality of slides each having means for gripping the work, said slide being adapted to move the work into engagement with the forming devices, means operating in conjunction with certain of the slides for cutting the work to a predetermined length and for drilling one end of the work, means operating in conjunction with another of the slides for shaping the work, and means for transferring the work from one to the other of said slides.

31. In a temple swaging machine, the combination with a support, of slides mounted thereon having work holding jaws, a tipping head and a reducing head alined with different slides, the tipping head being adapted to round over the end of the work, the reducing head being adapted to shape the work to a predetermined size, means for moving the work from the tipping head to the reducing head, and means for opening the jaws to release the work when completed.

32. In a temple swaging machine, the combination with a series of heads for sequential operation on blanks of material, of a series of slides located adjacent thereto for holding the blanks, means connected with one of said slides for cutting off a blank when held by the same slide, means for moving said slide into operative relation to one of the heads and means for transferring the blanks from one of the heads to the other.

33. In a temple forming machine, the combination with a plurality of operating devices including a drill for countersinking a portion of the temple blank, a cutter for cutting the blanks to a predetermined length and a tipping head for rounding the portion of the blanks adjacent the countersinks therein, of a slide having means for gripping a blank, and means for shifting the slide to bring the blank held thereby into operative relation with each of the said operating devices.

34. In a temple forming machine, the combination with a work holder, of a cutter for cutting the work to a predetermined length, a drill for countersinking a portion of each of the blanks, and a tipping head for rounding over the material of the blanks adjacent the countersinks, and means for relatively shifting the holder and said parts to bring a blank held by the holder into engagement with each of the said operating devices.

35. In a swaging machine, the combination of a head having a passage therethrough, of means for introducing a wire into said passage comprising jaws for gripping the wire and moving it along, means for swaging the wire while held by said jaws, means for gripping the wire at a distance from the jaws, and means for cutting off the wire beyond the jaws.

36. In a swaging machine, the combination of a head having a passage therethrough, of means for introducing a wire into said passage comprising jaws for gripping the wire and moving it along, swaging means in the head for operating on the wire, means for cutting a blank therefrom, a second head having a passage therethrough provided with reducing dies therein, and means whereby the blank previously cut off is introduced into the passage in the second head.

37. In a swaging machine, the combination with a set of heads each having a passage therein, of means for introducing a blank into the passage in one of said heads, means in the passage for breaking down the portion of the blank introduced thereinto, means for transferring the blank to another head, and means in the second head for finishing that part of the blank introduced therein which has been previously broken down.

38. In a temple swaging machine, the combination with a plurality of heads, of a series of feed slides equal in number to the number of the heads, each of said slides being provided with work gripping jaws, means for simultaneously shifting the various slides to introduce the blanks carried thereby into their respective heads, means carried by one of the heads for preliminarily breaking down a blank, means carried by another of the heads for reducing said broken down portion to approximate size, and additional means for finishing the broken down and reduced portion of the blank.

39. In a temple swaging machine, the combination with a plurality of heads, of a series of feed slides equal in number to the number of the heads, each of said slides being provided with work gripping jaws, means for moving the various slides to introduce the work carried thereby into their respective heads, means carried by one of the heads for preliminarily breaking down a portion of stock, means for severing a blank including said broken down portion, means for transferring the blank to another of the heads, and means in said head for reducing said broken down portion to approximate size.

40. In a temple swaging machine, the combination with a plurality of heads, of a series of feed slides equal in number to the number of the heads, each of said slides being provided with work gripping jaws, means for moving the various slides to introduce the work carried thereby into their respective heads, means carried by one of the heads for preliminarily breaking down a portion of stock, means for severing a blank including said broken down portion, means for transferring the blank to another of the heads, means in said head for reducing said broken down portion to approximate size, and additional means in one of the several heads for finishing said reduced portion of the blank.

41. In a temple swaging machine, the combination with a set of die heads, of means connected therewith for sequentially operating on blanks held therein, shifting means movable between the heads, means for intermittently shifting the same to transfer a blank from one head to another, and means for feeding all the blanks back and forth when in registratiotn with the heads.

42. In a temple forming machine, the combination of a plurality of supports for countersinking portions of blanks brought into engagement therewith, a drill carried by one of the supports, tipping dies for rounding over the material of the blanks adjacent the countersunk portions therein, breaking down dies for initially reducing the blanks to a desired shape, and finishing dies carried by certain of the other supports for final operation on the blanks, means for operating the drill and the various dies, and means for bringing a blank into operative engagement with each of the said devices.

43. In a pear tip temple forming machine or the like, the combination of means for drilling the end of a blank, means for heading the drilled end, means for breaking down the blanks initially to a rough shape, means for finishing the reduction of the blank, means for determining and limiting the length of the completed temple, slides for feeding the blanks to the various operating means, and means for shifting the blank into operative engagement with the various operating means.

44. In a temple forming machine, the combination of means for drilling the end of a blank, means for hammering over the drilled end of the blank and forming it into a pear tip, and means for moving the blank from said drilling means to said pear tip forming means.

45. In a temple forming machine or the like, the combination of means for swaging a blank, a pair of jaws, means for introducing a blank between said jaws, means for clamping the blank in the jaws, means adjacent the jaws for drilling the end of the blank while held in the jaws and means for forming the drilled end of the blank into a pear tip.

46. In a temple forming machine or the like, the combination with a series of devices for gripping and carrying blanks, means for drilling a hole longitudinally in the end of the blank, means for hammering over the drilled end of the blank and for forming it into a pear tip, means for moving the blank to the drilling means and then to the hammering means, and means operating in conjunction with the gripping devices for cutting off the blank.

47. In a temple forming machine or the like, the combination with a support, of means thereon for drilling a hole in the end of a blank, means carried by the support for hammering over the drilled end of the blank and forming it into a rounded tip, means on the support for operating said drilling and hammering means and means for moving a blank to said drilling means and thereafter to said hammering means.

48. In a temple forming machine or the like, the combination of a support, a series of cams rotatably mounted thereon, slides carried by the support, operative connections between the cams and slides for actuating the latter, a chuck on each slide, means for introducing a wire or blank into each chuck, pins controlled by certain of the cams, and means operated by the pins for controlling the operation of the chucks.

49. In a swaging machine, the combination with a rotary member having a cam portion, of a slide adjacent thereto, means for connecting the slide and the cam to reciprocate the slide, a jaw controlling spindle on the slide having an arm thereon, a trip pin for engaging said arm to operate the jaws and connections between the pin and the rotary member for intermittently moving the pin into operative position.

50. In a swaging machine, the combination of a support, a set of work heads mounted on the support, sets of dies operatively related to the heads for sequential operation on the spot being swaged, and means carried by the support for shifting the stock from one head to the next.

51. In a temple forming machine, the combination with means for reducing and shaping the side and ear hook portions of the temple, of means for tipping one end of the temple, said tipping means including a drill for cupping the end of the stock and hammering devices for closing the mouth of the cup.

52. In a temple forming machine, the combination with a head, of means in the head for swaging the stock, a drill for cupping the end of the stock, a head containing dies for receiving the cupped end and closing and shaping the same, and means automatically controlling the operation of said parts on the stock.

In testimony whereof I affix my signature in presence of two witnesses.

ARTHUR A. ARNOLD.

Witnesses:
H. K. PARSONS,
FLORENCE E. CODERRE.